United States Patent
Zolock et al.

(10) Patent No.: US 6,331,674 B1
(45) Date of Patent: Dec. 18, 2001

(54) EXPLOSION PROOF TERMINAL BLOCK HOUSING THAT MAY BE OPENED

(75) Inventors: Michael J. Zolock, Longmont; Allan L. Samson, Ft. Lupton, both of CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/540,083

(22) Filed: Mar. 31, 2000

(51) Int. Cl.⁷ ...................................................... H02G 3/18
(52) U.S. Cl. .................. 174/60; 439/703; 174/64
(58) Field of Search ............................ 174/60, 50, 17 R, 174/58, 63, 64; 220/3.2, 4.02; 439/709

(56) References Cited

U.S. PATENT DOCUMENTS

| | | | | |
|---|---|---|---|---|
| 4,243,834 | * | 1/1981 | Logioco | 174/38 |
| 5,378,174 | * | 1/1995 | Brownlie et al. | 439/709 |
| 5,563,372 | * | 10/1996 | Messelhi | 174/60 |
| 5,675,194 | * | 10/1997 | Domigan | 307/147 |
| 5,835,981 | * | 11/1998 | Smith | 174/82 |
| 6,127,627 | * | 10/2000 | Daoud | 174/50 |
| 6,151,776 | * | 11/2000 | Disaverio et al. | 29/868 |

* cited by examiner

Primary Examiner—Dean A. Reichard
Assistant Examiner—Dhiru R Patel
(74) Attorney, Agent, or Firm—Chrisman, Bynum & Johnson, P.C.

(57) ABSTRACT

A terminal block for connecting intrinsically safe rated circuits and increased safety rated circuits. The terminal block includes a housing that forms an enclosed area. A first surface at a first end of the housing has openings through the surface. A first set of conductors for connecting intrinsically safe rated circuits has terminals in the enclosed area and extend through the openings. A second set of conductors for connecting increased safety rated circuits has terminals in the enclosed area and extend through the openings. A wall on the first surface separates said terminals of the first set of conductors from the terminals of the second set of conductors. Finally, a cover over the second set of conductors extends from a top side of the wall substantially to a side of the housing to enclose the second set of conductors inside the enclosed area to allow the housing to be opened.

12 Claims, 2 Drawing Sheets

US 6,331,674 B1

EXPLOSION PROOF TERMINAL BLOCK HOUSING THAT MAY BE OPENED

FIELD OF THE INVENTION

This invention relates to a terminal block for connecting both increased safety rated circuits and intrinsically safe rated circuits. More particularly, this invention relates to a terminal block inside a housing that connects both increased safety rated circuits and intrinsically safe rated circuits. Still more particularly, this invention relates to a terminal block that allows the housing to be opened by physically enclosing the increased safety rated circuits inside an enclosure in the housing to prevent arcing with the intrinsically safe circuits.

Problem

It is common for electronic circuits to be used in hazardous environments. Hazardous environments are environments containing volatile material that could be ignited by heat or sparks from electronic circuits. Some examples of volatile materials are gases such as hydrogen. Since electronic circuits must be used in these environments, several regulatory agencies such as the UL in the United States, CENELEC in Europe, CSA in Canada, and TIIS in Japan rate the electronic circuits for use in these hazardous environments. The rating of electronic circuits requires the housing around the circuits prevent the electronic circuits from igniting the volatile material.

One such rating for electronic devices is intrinsically safe. An intrinsically safe circuit is a circuit that operates under a certain energy level. The certain energy level is low enough to assure that the circuit cannot generate a spark or enough heat to ignite the volatile material.

A second such rating is increased safety. An increased safety circuit operates at a higher energy level than an intrinsically safe circuit. However, an increased safety circuit still has many safety features to prevent arcing in the circuit.

It is a problem that when circuits having different ratings are used in the same environment that the circuits must remain separate to maintain the ratings. For example, if an increased safety rated circuit is used in the same hazardous environment as an intrinsically safe circuit, the increased safety circuit must be physically separated from the intrinsically safe circuit in order for the intrinsically safe rating. The maintenance of the safety rating may be important to allow the intrinsically safe circuit to be kept in a less protective housing.

One system in which two differently rated circuits may be in a hazardous environment is a Coriolis flowmeter. A Coriolis mass flowmeter measures mass flow and other information of materials flowing through a pipeline in the manner described by U.S. Pat. No. 4,491,025 issued to J. E. Smith, et al. of Jan. 1, 1985 and Re. 31,450 to J. E. Smith of Feb. 11, 1982. A Coriolis mass flowmeter has one or more flow tubes of a curved or straight configuration. Each flow tube configuration in a Coriolis mass flowmeter has a set of natural vibration modes, which may be of a simple bending, torsional, radial, or coupled type. Each flow tube is driven to oscillate at resonance in one of these natural modes. The natural vibration modes of the vibrating, material filled systems are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies a vibrational force to the flow tube. The force causes the flow tube to oscillate. When there is no material flowing through the flowmeter, all points along a flow tube oscillate with an identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Sensors are placed at two different points on the flow tube to produce sinusoidal signals representative of the motion of the flow tube at the two points. A phase difference of the two signals received from the sensors is calculated in units of time. The phase difference between the two sensor signals is proportional to the mass flow rate of the material flowing through the flow tube or flow tubes.

The sensors transmit the sinusoidal signals to a signal conditioner. The signal conditioner generates parameter signals that indicate properties of the material flowing through the flowmeter. The signal conditioner also generates a drive signal applied to the driver to vibrate the flow tubes. The parameter signals are then transmitted to a host system which provides the desired properties to a user.

In this system, power supplied to the host system is so great that the circuit receiving the power can only be increased safety rated. However, the processor and the signal conditioner may be operating at a low enough power level to be rated as intrinsically safe. Therefore, a terminal block for connecting power and a secondary processor to the host system require physical separation of the power from the other circuits.

Solution

The above and other problems are solved and an advance in the art is made by the terminal block housing of this invention. One advantage of this invention is that the increased safety rated circuits are separated from the intrinsically safe circuits. A second advantage is that the housing may be opened as the increased safety rated circuits are covered to maintain the physical separation when the housing is opened. A third advantage of this invention is that a cover over terminals for the increased safety rated terminal may be opened to inspect the terminals.

In accordance with this invention, an explosion proof terminal block housing for connecting intrinsically safe rated circuits and increased safety rated circuits is made in the following manner. A housing encloses an area. Inside the housing, there are openings through a first surface at a first end of the housing. A first set of conductors for connecting intrinsically safe rated circuits are connected to terminals inside the housing and extend through the openings.

A second set of conductors for connecting increased safety rated circuits are connected terminals in the housing and extend through the openings in the first surface. A wall extending upward from the first surface between two sides of the housing separates the terminals of the first set of conductors from the terminals of the second set of conductors. A cover over the second set of conductors extends from a top side of the wall substantially to a side of the housing to enclose the second set of conductors inside the enclosed area. The wall and cover physically enclosing the increased safety circuit to allow the housing be opened.

The terminal block housing may also include an opening in a second end of the housing and a lid mated to the opening to enclose the housing. The lid and sides inside the housing may include threading on the lid to mate the lid to the opening. The threading allows the housing to be opened while maintaining a flame path when closed to remain explosion proof.

The cover may have a first edge coupled to a top side of the wall. A coupling allows the cover to be moved to expose said second set of conductors. A locking mechanism may prevent the cover from being moved to keep the second set of conductors enclosed. The coupling may be a hinge on a top side of the wall and a first edge of the cover to affix the cover to the wall. The locking mechanism may be a captive pin that fits though an opening in the cover and affixes to an opening on a bottom side of the cover to lock the cover in place. The first surface of the housing may also have unshaped walls extending outward from the first surface to enclose each of the first set of conductors on three sides.

In another aspect of this invention, the terminal block inside the housing has a molding having a base with a first surface that has molding defining unshaped walls and the wall extending outward from the first surface, a second surface that rests upon the first surface of the first end of the housing, openings through the base through which the first and second sets of conductors extend, and a sidewall extending outward from a first end of the first surface to a second end of the wall to form an enclosure housing the second set of conductors.

The base may also include a first cavity in the second surface of the molding around the openings for the first set of conductors. There may also be a second cavity in the second surface of the molding around the openings for said second set of conductors. A sealant may be injected into the first and second cavity to limit the flame path to the conductor. The sealant may be an o-ring or an injected epoxy.

DESCRIPTION OF THE DRAWINGS

The above and other aspects of this invention may be understood from the detailed description and the following drawings.

DETAILED DESCRIPTION

Figure 1:
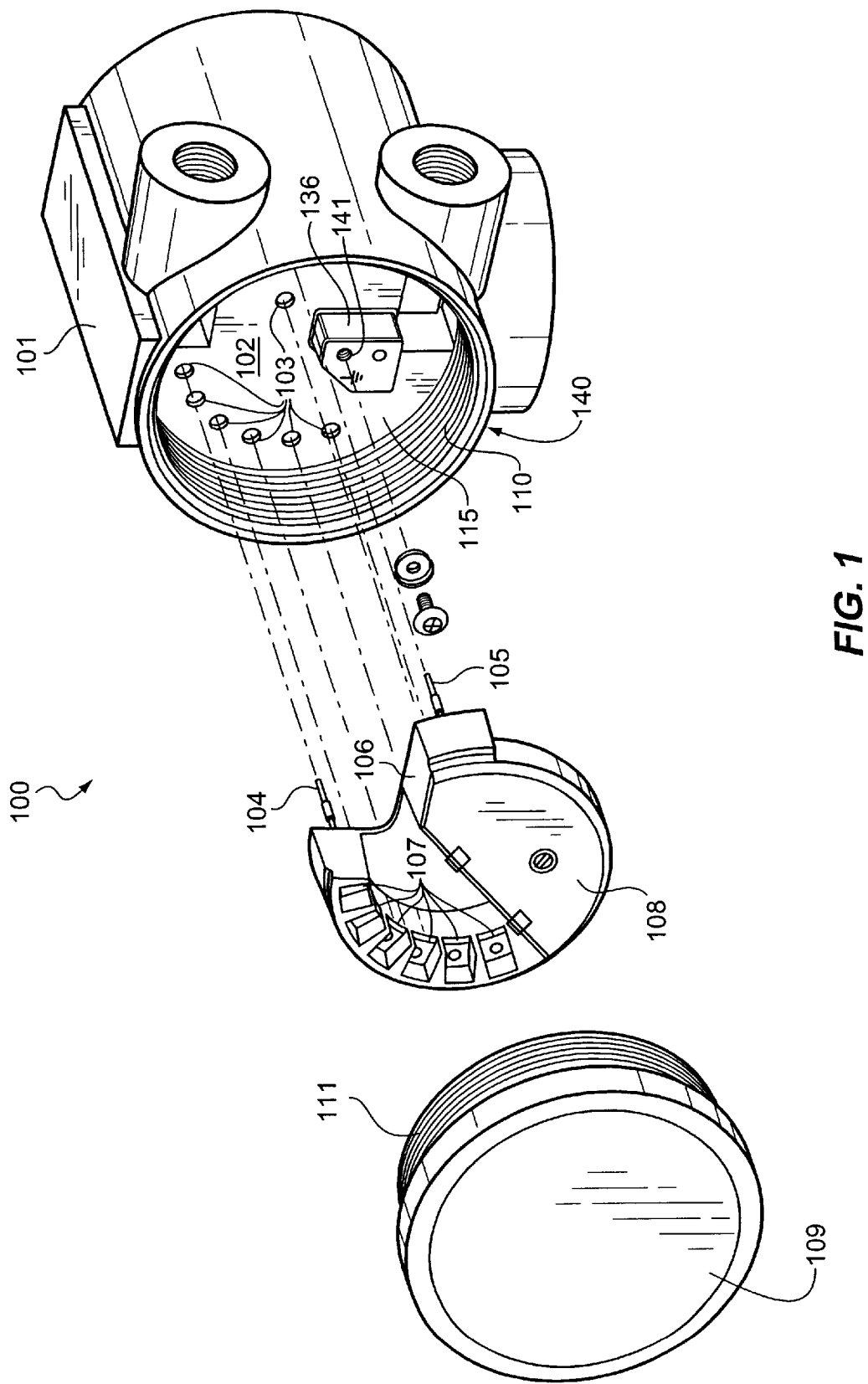
FIG. 1 depicting a top side exploded view of an explosion proof terminal block housing in accordance with this invention.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

FIG. 1 illustrates an explosion proof terminal block housing system 100 in accordance with this invention. Housing 101 is a housing that is rated explosion proof. The explosion proof rating means that housing 101 can contain an explosion of volatile material inside the housing without a rupture in the housing that may allow the explosion to escape. The specifications for an explosion proof housing are given by the various regulating agencies, such as the Underwriters Laboratories (UL) and Canadian Standards Association (CSA). Housing 101 encloses a chamber 115. Chamber 115 houses the terminal housings 107 and 125 (SEE FIG. 2) that are to be connected to circuits inside housing 101 by conductors 104 and 105. For purposes of the present invention, a discussion of the circuits to be connected is not important.

Inside chamber 115 of housing 101 is a first surface 102 at a first end of the enclosure. There are openings 103 that extend through first surface 102 to either another chamber in the housing 101 or through the end of the housing 101. Conductors 104 and conductors 105 extend through openings 103 to connect circuits on one side of surface 102 to circuits on a second side of surface 102.

Conductors 104 are a first set of conductors that connect intrinsically safe circuits on one side of surface 102 to intrinsically safe circuits on a second side of surface 102. Terminals 107 are on top of conductors 104 and allow the connection of a lead to each conductor. Conductors 105 are a second set of conductors that connect increased safety rated circuits on one side of surface 102 to increased safety rated circuits on a second side of surface 102. Conductors 105 extend through openings 103 through elevated member 136 which protrudes from surface 102. One skilled in the art will recognize that elevated member 136 is not required to practice this invention.

Wall 106 is a barrier that extends out from first surface 102 between conductors 104 and conductors 105. Wall 106 is a physical separation between the first and second set of conductors to maintain the separation required to maintain the safety rating of the intrinsically safe. A cover 108 extends over conductors 105 between the top side of wall 106 and the sides of chamber 115. Cover 108 completes a total enclosure of conductors 105 to complete a total separation of conductors 104 and 105 inside chamber 115. This total enclosure allows chamber 115 to be opened, since conductors 105 are not exposed by the opening of chamber 115.

In order to enclose chamber 115, a lid 109 affixes to a second side 140 of housing 101. Lid 109 has threaded sides 111, which are mated to threads 110 on the sides of chamber 115. The threads 110–111 provide flame path that is long enough to allow housing 101 to be explosion proof. Since the terminals for the increased safety conductors 105 are covered, lid 109 may be removed to allow the terminals connected to the intrinsically safe conductors 104 to be exposed. This allows a user to physically connect leads to the terminals.

Figure 2:
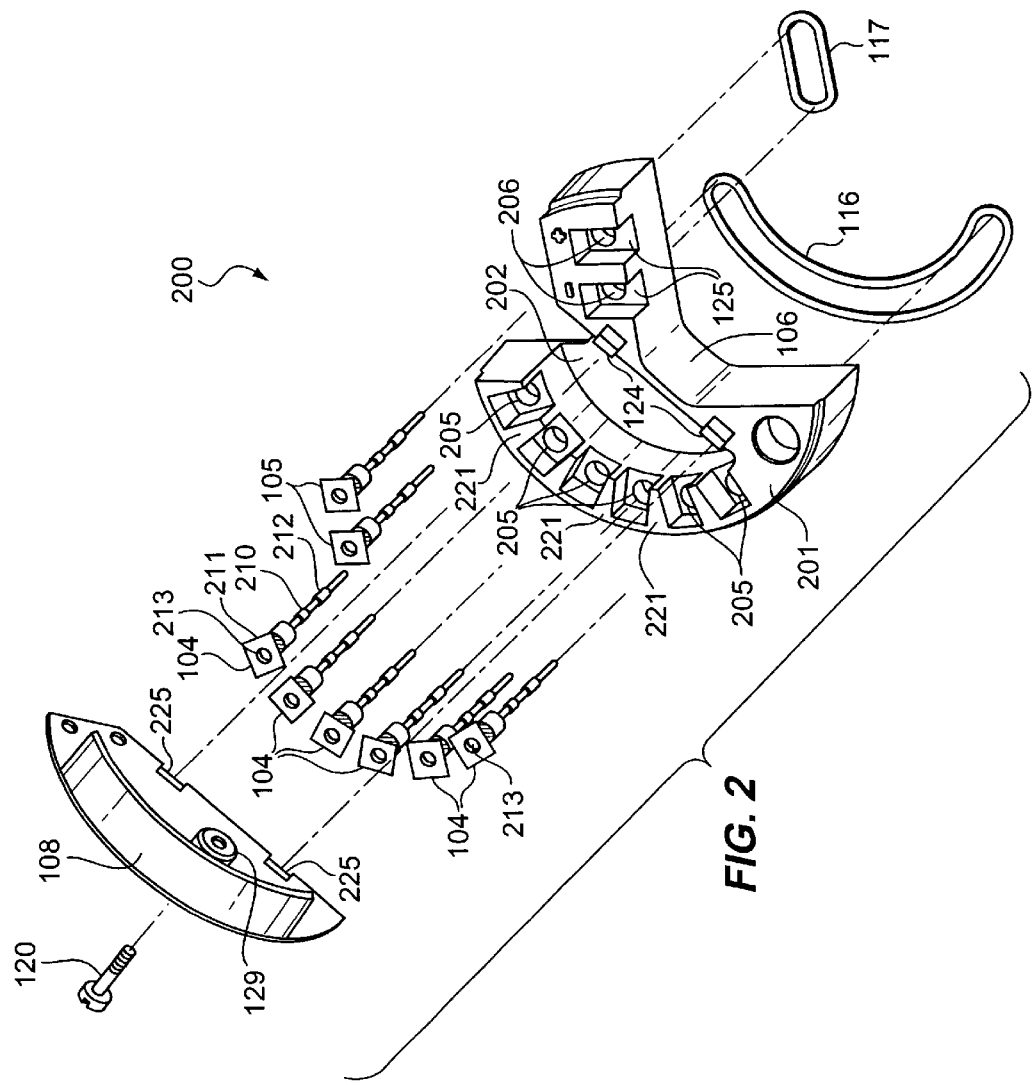
FIG. 2 depicting an exploded top side view of a molding for a base in an explosion proof terminal housing of this invention.

FIG. 2. illustrates an exploded top side view of a molding 200 that is inserted into chamber 115 in a preferred exemplary embodiment of this invention. Molding 200 has base 201 with a first or top side 202. Wall 106 extends outward substantially perpendicular from first side 202 to separate openings 205 from openings 206. Openings 205 and 206 are mated to openings 103 in surface 102. Openings 205 receive first set of conductors 104 and openings 206 receive second set of conductors 105. Terminal housings 125 are niches in wall 106 that enclose openings 206 to prevent arcing between the conductors 105 in case of a short.

U-shaped walls 221 extending out of surface 202 may also be part of molding 200. U-shaped walls 221 substantially enclose openings 205 for first set of conductors 104 on three sides to prevent arcing between terminals in case of a short. U-shaped walls 221 encloses the terminals of each of first set of conductors 104. U-shaped walls 221 also prevents loose leads from contacting one another.

Each conductor 104 and 105 is t pin 210 in a preferred exemplary embodiment. Each pin 210 has a head 211 with a shaft 212 extending from one end of head 211. A threaded opening 213 in each head 211 receives a threaded screw (Not shown) to affix leads to each pin 210.

Cover 108 extends from wall 106 and covers terminal housings 125. Cover 108 is affixed to wall 106 by a coupling that allows cover 108 to be opened to connect leads to second set of conductors 105. Typically, the leads are connected to second set of conductors 105 at the time of installation and the cover is then locked in a manner that cover 108 may not be opened. In a preferred exemplary embodiment, cover 108 is affixed to wall 106 by a hinge made of bars 225 and receiving notches 224. One skilled in the art will recognize that the bars and notches may be interchanged and that other configurations are possible.

Cover 108 has an opening 129. Captive pin 120 fits through opening 129 and into a threaded opening 141 in surface 102 of FIG. 1 to lock cover 108 in a closed position.

Figure 3:
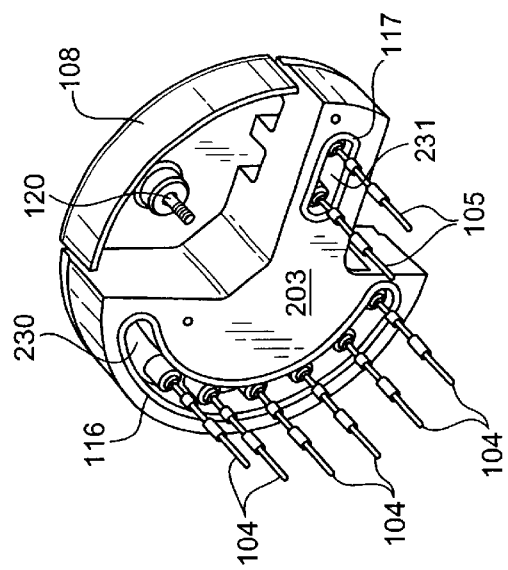
FIG. 3 illustrating a bottom side view of the molding for a base.

FIG. 3 shows a bottom or second surface 203 of molding 200. Second surface 203 is affixed to first surface 102 in some manner such as an epoxy. Second surface 203 has a first cavity 230 around the openings 205 for first set of conductors 104 and a second cavity 231 around openings 206 for second set of conductors 105. A sealant is placed in first and second cavities 230 and 231 to reduce the flame path through the terminal block to the conductors 104 and 105. In a preferred embodiment, the sealant is O-rings 116 and 117.

The above is a description of an explosion proof terminal housing in accordance with this invention. It is expected that those skilled in the art will design alternative explosion proof terminal housing that infringe on this invention as set forth in the claims below either literally or through the Doctrine of Equivalents.

What is claimed is:

1. A terminal block for connecting intrinsically safe rated circuits and increased safety rated circuits comprising:
   a housing that forms an enclosed area;
   a first surface at a first end of said housing;
   openings through said first surface;
   a first set of conductors for connecting intrinsically safe rated circuits having terminals in said enclosed area and extending through said openings;
   a second set of conductors for connecting increased safety rated circuits having terminals in said enclosed area and extending through said openings;
   a wall on said first surface and extending substantially perpendicular to said first surface, the wall separating said terminals of first set of conductors from said terminals of second set of conductors; and
   a cover configured to affix to a top side of said wall on said first surface of said first end of said housing and extend substantially to a side of said housing to enclose said second set of conductors.

2. The terminal block of claim 1 further comprising:
   an opening in a second end of said housing; and
   a lid mated to said opening to close said housing.

3. The terminal block of claim 2 further comprising:
   threading on said lid and sides of said opening in said second end to mate said lid to said opening in said second end.

4. The terminal block of claim 1 further comprising:
   a coupling between said top side of said wall and a first edge of said cover that allows said cover to be moved to expose said second set of conductors.

5. The terminal block of claim 4 further comprising:
   a locking mechanism that prevents said cover from being moved to keep said second set of conductors enclosed.

6. The terminal block of claim 5 wherein said locking mechanism comprises:
   a captive pin that fits though an opening in said cover and affixes to a threaded opening in said first surface of said first end of said housing to lock said cover in place.

7. The terminal block of claim 1 further comprising:
   u-shaped walls extending outward from said first surface of said first end of said housing to enclose each of said first set of conductors.

8. The terminal block of claim 7 further comprising:
   a molding having a base having a first molding surface that has molding defining said u-shaped walls;
   a second molding surface that rests upon said first surface of said first end of said housing;
   openings through said base through which said first and said second sets of conductors extend; and
   a wall on said molding that extends substantially perpendicular from said second molding surface to form said wall on said first surface of said first end of said housing.

9. The terminal block of claim 8 further comprising:
   a hinge on a top side of said wall on said molding and a first edge of said cover to affix said cover to said wall on said molding.

10. The terminal block of claim 8 further comprising:
    a first cavity in said second molding surface of said molding around said openings in said base for said first set of conductors; and
    sealant that is injected into said first cavity.

11. The block of claim 10 further comprising:
    a second cavity in said second molding surface of said molding around said openings in said base for said second set of conductors; and
    sealant that is injected into said second cavity.

12. The block of claim 11 wherein said sealant comprises:
    an o-ring.

* * * * *

UNITED STATES PATENT AND TRADEMARK OFFICE
CERTIFICATE OF CORRECTION

PATENT NO. : 6,331,674 B1  
DATED : December 18, 2001  
INVENTOR(S) : Michael J. Zolock and Allan L. Samson It is certified that error appears in the above-identified patent and that said Letters Patent is hereby corrected as shown below:

Column 3,  
Line 14, replace "unshaped walls extending outward from the first surface to" with -- u-shaped walls extending outward from the first surface to --  
Line 18, replace "surface that has molding defining unshaped walls and the" with -- surface that has molding defining u-shaped walls and the --

Column 5,  
Line 1, replace "Each conductor 104 and 105 is t pin 210 in a preferred" with -- Each conductor 104 and 105 is a pin 210 in a preferred --

Signed and Sealed this

Fourth Day of June, 2002

Attest:

Attesting Officer

JAMES E. ROGAN  
*Director of the United States Patent and Trademark Office*